No. 688,920. Patented Dec. 17, 1901.
F. H. BEECHER.
STOVE DAMPER.
(Application filed May 4, 1901.)
(No Model.)

UNITED STATES PATENT OFFICE.

FRANK H. BEECHER, OF SEYMOUR, CONNECTICUT.

STOVE-DAMPER.

SPECIFICATION forming part of Letters Patent No. 688,920, dated December 17, 1901.

Application filed May 4, 1901. Serial No. 58,726. (No model.)

*To all whom it may concern:*

Be it known that I, FRANK H. BEECHER, of Seymour, in the county of New Haven and State of Connecticut, have invented a new Improvement in Stove-Dampers; and I do hereby declare the following, when taken in connection with the accompanying drawings and the letters of reference marked thereon, to be a full, clear, and exact description of the same, and which said drawings constitute part of this specification, and represent, in—

Figure 1:
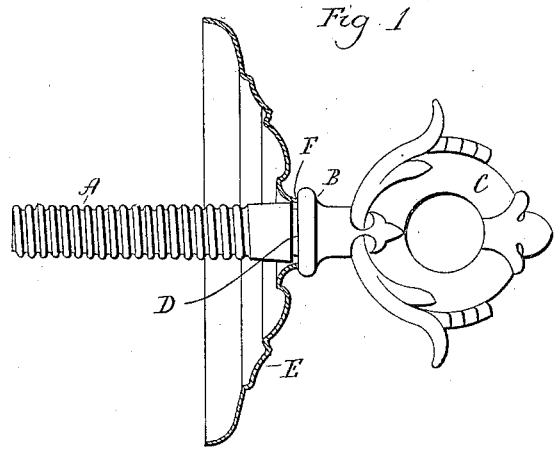
Figure 2:
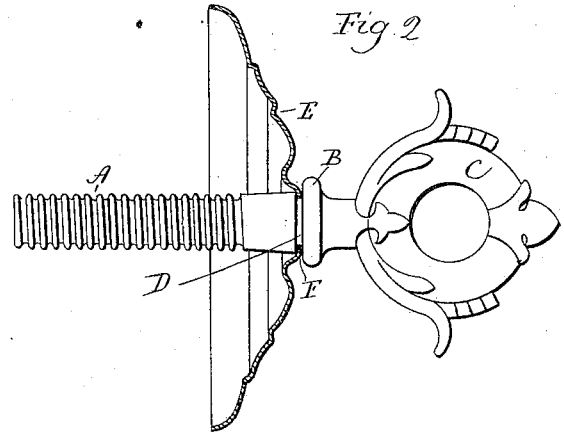

Figure 1, a side view of a damper constructed in accordance with my invention, showing the plate in section and the members in position preparatory to being interlocked; Fig. 2, a similar view with the parts connected.

This invention relates to an improvement in stove-dampers, and particularly to that class which comprises a screw-shank and a disk or plate carried thereby and which may be moved toward or from a stove door or pipe by the rotation of the screw, the object of the invention being a simple and inexpensive means for securely interlocking the plate with the screw-shank, yet permitting the screw to rotate in the plate; and it consists in the construction as hereinafter described, and particularly recited in the claim.

As herein shown, my damper consists of a screw-threaded shank A and a head B, which may have an ornamental thumb-piece C of any approved design. In the shank, directly beneath the head B, is an annular groove D. The plate E may be circular or other desired form, having a central opening F, the edge of which primarily projects outward, as shown in Fig. 1 of the drawings, and the diameter of which corresponds to the diameter of the threaded shank A. The edge of the opening F is adapted to be turned into the groove D, as shown in Fig. 2 of the drawings, whereby the shank is swiveled with the plate. This edge may be readily turned into its locked position by properly supporting the plate and forcing the screw downward, so that the head B upsets the edge of the plate and turns the edge into the groove D. When thus turned into the groove, the plate is securely interlocked with the shank, yet the shank is free to turn independent of the plate. This construction avoids the employment of washers, cotter-pins, or other devices for swiveling the plate with the screw-shank, and is therefore not only less liable to become detached, but cheaper to manufacture.

I am aware that various articles comprising a shank and a sheet-metal cup-shaped member through which the shank extends have been united by having the edge of the opening in the cup-shaped member forced into a groove in the shank, and therefore do not wish to be understood as claiming, broadly, such as my invention.

Having fully described my invention, what I claim as new, and desire to secure by Letters Patent, is—

In a damper the combination with a screw-shank having a head and an annular groove directly beneath said head, of a plate having a central opening through which the shank may pass, the edge of the said opening primarily extending outward and adapted to bear upon the under side of said head which under pressure will force the said edge into said groove and thereby swivel the plate and shank together substantially as described.

In testimony whereof I have signed this specification in the presence of two subscribing witnesses.

FRANK H. BEECHER.

Witnesses:
HENRY H. BANCROFT,
R. G. CORNFORTH.